United States Patent [19]

Barbera

[11] Patent Number: 4,925,118
[45] Date of Patent: May 15, 1990

[54] DEVICE FOR THE AUTOMATIC CHANGE-OVER OF THE FORM IN A COIL WINDER FOR FORMING THE WINDING OF A DYNAMO-ELECTRIC MACHINE

[75] Inventor: Giorgio Barbera, Leumann-Collegno, Italy

[73] Assignee: Officine Meccaniche Pavesi & C.S.p.A., Turin, Italy

[21] Appl. No.: 260,413

[22] Filed: Oct. 20, 1988

[30] Foreign Application Priority Data

Mar. 25, 1988 [IT] Italy .............................. 67273 A/88

[51] Int. Cl.⁵ .......................... B21F 3/04; B65H 81/06
[52] U.S. Cl. .................................. 242/1.1 R; 140/92.1
[58] Field of Search .............. 242/1.1 R, 1.1 A, 1.1 E, 242/7.06, 7.09, 7.14, 7.15, 7.16; 403/354, 289; 414/684, 911, 910, 908; 29/732, 736; 140/92.1

[56] References Cited

U.S. PATENT DOCUMENTS

| | | | |
|---|---|---|---|
| 2,327,951 | 10/1941 | Zaleske | 403/289 |
| 3,280,439 | 10/1966 | McCarthy | 403/354 |
| 3,719,378 | 8/1971 | Windsor | 403/289 |
| 3,791,419 | 2/1974 | Arick et al. | 140/92.1 |
| 4,489,764 | 12/1984 | Walker | 140/92.1 |
| 4,650,131 | 5/1985 | Droll et al. | 140/92.1 |

FOREIGN PATENT DOCUMENTS 521030 6/1953 Belgium ........................ 242/1.1 R Primary Examiner—Joseph J. Hail, III
Attorney, Agent, or Firm—Sughrue, Mion, Zinn, Macpeak & Seas

[57] ABSTRACT

In a coil winder for forming the winding of a dynamo-electric machine, the change-over of the form on which coils of the winding are wound is effected automatically. A rotatable platform is located beneath the form and is movable in the direction of its axis of rotation between a position close to the form and a position spaced herefrom. The platform has an empty bearing zone for the form intended to be removed from the coil winder and a support zone occupied by the replacement form. When it is wished to replace the form, the rotatable platform is arranged in its close position with the empty zone beneath the form to be removed and the latter is deposited on it by the deactivation of the rapid-attachment connection which connect the form to the coil winder.

6 Claims, 3 Drawing Sheets

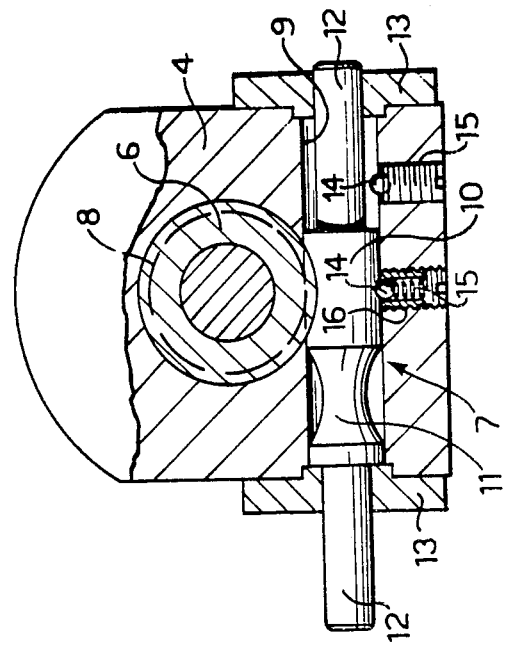
FIG. 7
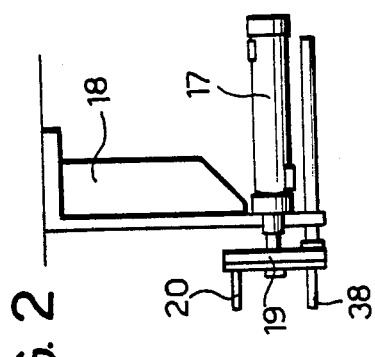
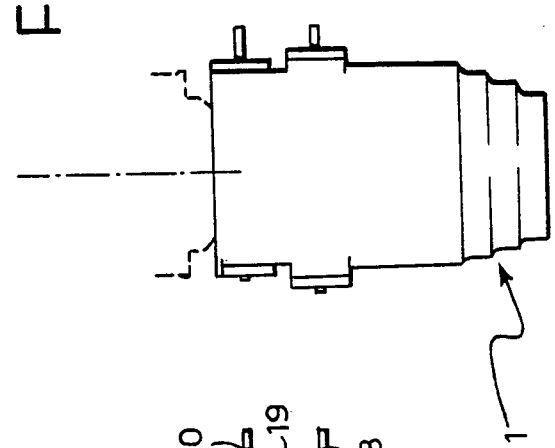
FIG. 2
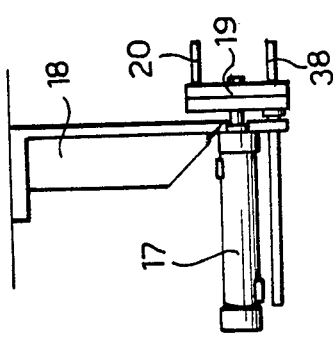

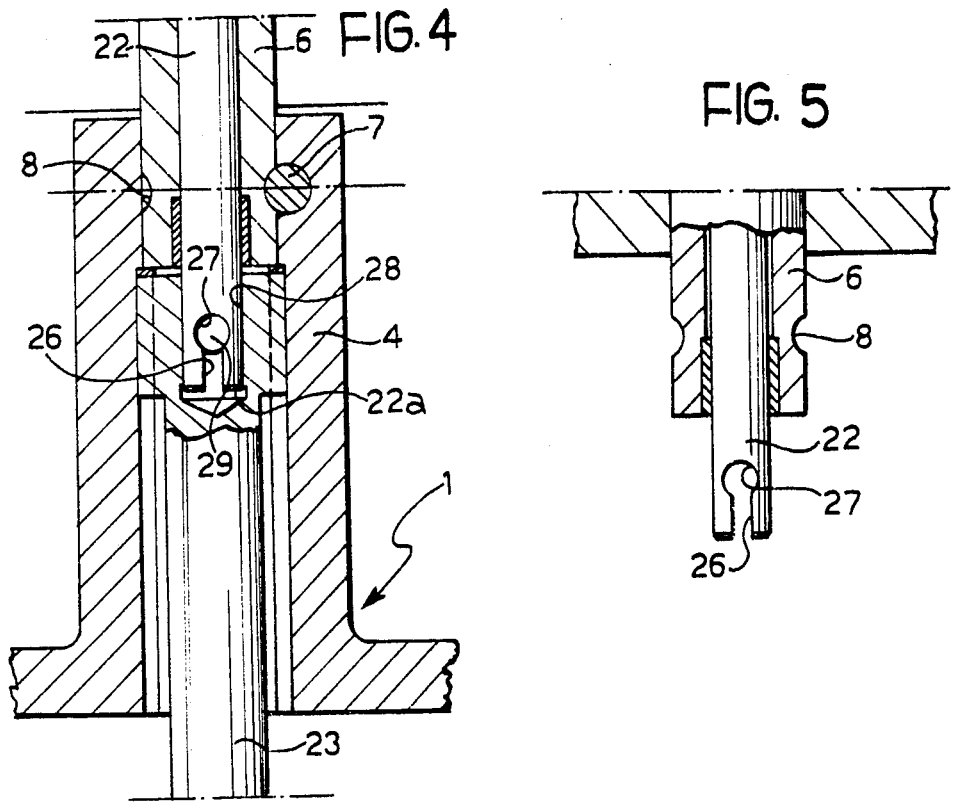
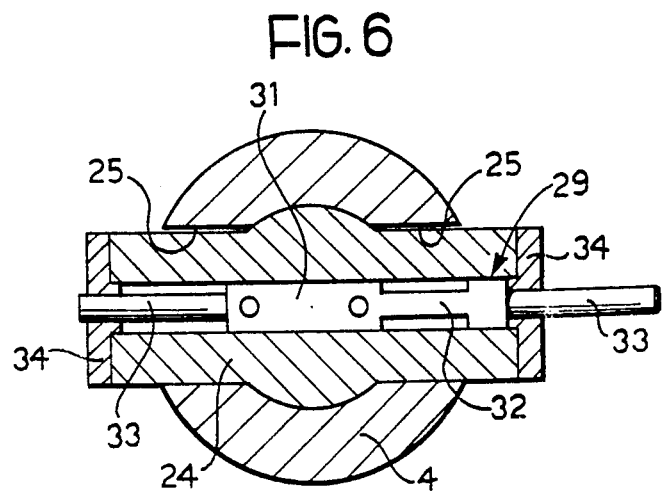

DEVICE FOR THE AUTOMATIC CHANGE-OVER OF THE FORM IN A COIL WINDER FOR FORMING THE WINDING OF A DYNAMO-ELECTRIC MACHINE

BACKGROUND OF THE INVENTION

The present invention relates to coil winders used for forming the stator windings of dynamo-electric machines.

Conventionally such coil winders have a form on which the coil of the winding is wound by means of a winding arm which is rotated about the form and which is supplied with the wire for the winding. Naturally, the dimensions and shape of the form depend on the type of winding which is to be made. It is thus necessary to change the form of the coil winder each time it is wished to form a different type of winding.

SUMMARY OF THE INVENTION

The object of the present invention is to provide a device which makes the replacement of the form in a coil winder particularly simple and quick.

In order to achieve this object, the invention provides a device for the automatic change-over of the form of a coil winder for forming the winding of a dynamo-electric machine, characterised in that it comprises:
- rapid attachment means for the connection of the form to the coil winder,
- a rotatable platform disposed beneath the form and movable along its axis of rotation between a position close to the form and a position spaced therefrom, the rotatable platform having an empty support zone for the form intended to be taken from the coil winder and a support zone occupied by the replacement form,
- means for driving the movement of the platform and for operating the rapid attachment connection means, in the following successive stages:
- arrangement of the platform in its close position with the empty zone disposed immediately under the form to be removed,
- disconnection of the form to be removed from the coil winder and consequent deposition of this form on the platform,
- movement of the platform into its spaced position, rotation of the platform to bring the replacement form beneath the coil winder, and subsequent movement of the platform into its close position,
- connection of the replacement form to the coil winder,
- withdrawal of the platform from the coil winder.

BRIEF DESCRIPTION OF THE DRAWINGS

Further characteristics and advantages of the invention will become apparent from the description which follows with reference to the appended drawings, provided purely by way of non-limiting example, in which:

FIG. 2 is a view taken on the arrow II of FIG. 1, FIG. 4 illustrates the detail IV of FIG. 1 on an enlarged scale, FIG. 5 illustrates a detail of FIG. 4 in a different operative condition, and FIGS. 6, 7 are two cross-sections taken on the lines VI—VI and VII—VII of FIG. 3.

DETAILED DESCRIPTION

Figure 1:
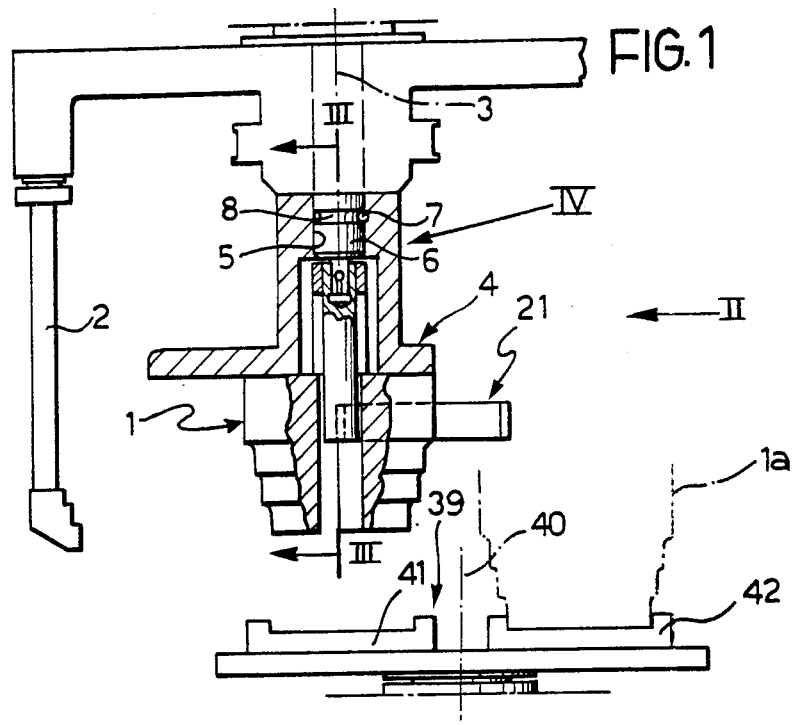
FIG. 1 is a partial schematic elevational view of a coil winder provided with the device according to the invention.

In FIG. 1, the form of a coil winder having a winding arm 2 rotatable about a central axis 3 is generally indicated 1. The constructional details of the coil winder are not described and illustrated since they are of known type and do not fall within the scope of the invention.

According to the invention, the form 1 includes a body 4 having a cylindrical hole 5 which houses a tubular support shank 6 carried by the coil winder. The body 4 can be coupled rapidly to the shank 6 by means of a transverse pin 7 arranged to engage a circumferential groove 8 in the shank 6. The transverse pin 7 is slidable in a transverse hole 9 in the body 4 (see FIG. 7) and has a portion 10 with a section corresponding to that of a hole 9, a portion 11 of narrower section, and two end spigots 12 which project from two covers 13 fixed to the body 4. The transverse pin 7 is movable between an operative position (illustrated in FIG. 7) in which the portion 10 engages the circumferential groove 8 so as to lock the body 4 to the shank 6, and an inoperative position in which the portion 11 is located in correspondence with the shank 6 so as to allow the body 4 to be removed from the shank. Snap-reference means are provided for each of the two positions and comprise a ball 14 urged by a spring 15 and arranged to engage a seat 16 in the portion 10 of the transverse pin 7. The movement of the transverse pin 7 between its two positions is driven by two jacks 17 supported by fixed support structures 18 on the two sides of the form and having their rods connected to a head 19 provided with a pin 20. The two pins 20 are intended selectively to engage the two spigots 12 to urge the pin towards one position or the other.

As is known, the form 1 has a member for expelling a winding formed thereon, which is constituted by a component slidable along the axis 3 relative to the body of the form and arranged to engage the winding to remove it from the form after it has been made. In FIG. 1, the expulsion member is illustrated schematically and generally indicated 21. The expulsion member 21 is driven by a shaft 22 which is slidable in the tubular shank 6 and is controlled by drive means located on the coil winder. These means are not described in the present description since they are of known type and do not fall within the scope of the invention.

In the device according to the invention, the shaft 22 is connected by rapid attachment means (which will be described in detail below) to an auxiliary shank 23 (FIG. 4) which supports the expulsion member 21. The shank 23 has a T-shaped head 24 which is guided in two longitudinal slots 25 (FIG. 6) formed in the body 4. Thus, the movement of the expulsion member 21 along the axis 3 relative to the form 1 is guided by this body 4.

Figure 3:
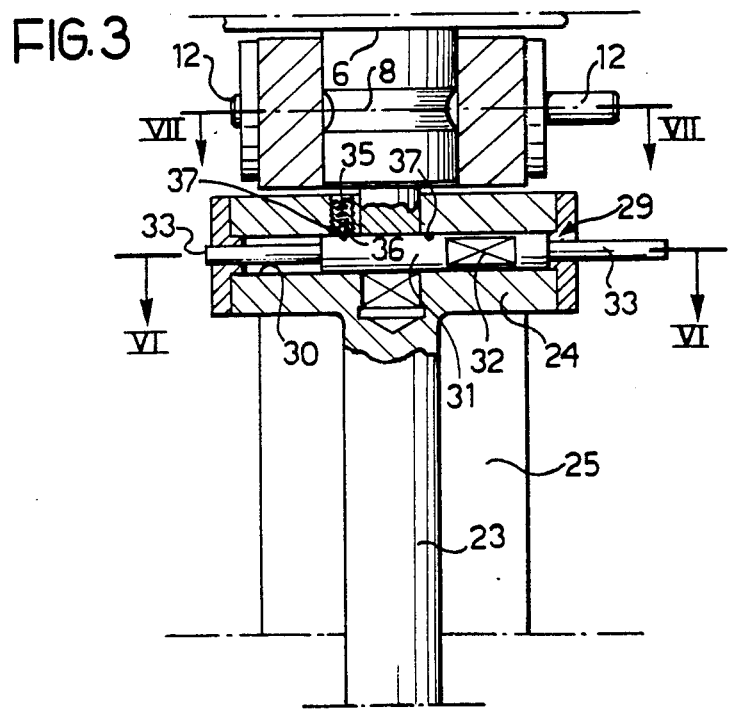
FIG. 3 is a cross-section taken on the line III—III of FIG. 1, on an enlarged scale.

With reference to FIG. 4, the free end of the drive shaft 22 for the expulsion member terminates in a surface 22a in which a slot 26 with an enlarged bottom portion 27 is formed. The end portion of the shaft 22 is housed in a seat 28 formed in the end wall of the head 24 and is locked in this seat by a transverse pin 29. The transverse pin 29 is slidable in a transverse hole 30 in the head 24 and engages the bottom portion 27 of the slot 26. As seen in FIGS. 3 and 6, the pin 29 has a portion 31 with a section corresponding to that of the hole 30 and a portion 32 having a section with flat parallel sides corresponding to the section of the narrower portion of the slot 26. The pin 29 finally has two end spigots 33 which project from the two covers 34 fixed to the head 24. The pin 29 has a first operative position (FIGS. 3, 6) in which the larger diameter portion 31 engages the bottom portion 27 of the slot so as to lock the head 24 above the shaft 22, and a second operative position in which the portion 32 is in correspondence with the slot 26 so as to allow the head 24 of the shaft 22 to be removed. In both positions, the spring 35 carried by the head 24 urges a ball 36 into a respective seat 37 formed in the portion 31. The movement of the pin 29 between its two positions is driven by the jacks 17 the heads 19 of which also carry two pins 38 for selectively contacting the spigots 33.

With reference to FIG. 1, a platform 39 is located beneath the machine and is rotatable about an axis 40 and movable therealong. The platform 39 has an empty zone 41 for supporting the form 1 to be removed from the coil winder and a support zone 42 occupied by the replacement form 1a.

In order to effect the change-over of the form, the platform 39 is positioned with the empty support zone 41 beneath the form 1 to be removed, whereafter it is moved close to the form 1. When this position is reached, the jacks 17 deactivate the rapid attachment coupling means 7, 29 so as to cause the form 1 to be deposited on the support zone 42. At this point, the platform 39 is moved away from the coil winder and rotates so as to bring the new form beneath the coil winder. The platform is then brought close to the coil winder to allow the shank 6 to be engaged in the hole 5 in the body 4 of the form and the shaft 22 to be engaged in the seat 28 of the head 24 of the expulsion member. The jacks 17 are then operated again to move the pins 7, 29 into their operative coupling positions, after which the rotatable platform 39 may be moved away.

FIG. 5 illustrates the shank 6 and the shaft 22 after the removal of the form.

Naturally, the principle of the invention remaining the same, the constructional details and forms of embodiment may be varied widely with respect to those described and illustrated purely by way of example, without thereby departing from the scope of the present invention.

What is claimed is:

1. A device for the automatic change-over of a form of a coil winder for forming the winding of a dynamo-electric machine, comprising:
    rapid attachment means for the connection and disconnection of said form to said coil winder;
    a rotatable platform disposed beneath said form in said coil winder and movable along an axis of rotation thereof between a first position close to said form and a second position spaced therefrom, said platform defining two support zones, a first zone for receiving said form intended to be removed from said coil winder and a second zone for supporting a replacement form;
    driving means for moving said platform between said first and second positions;
    means for rotating said platform when said platform is in said second position for selectively positioning one of said zones in alignment with said coil winder; and
    operating means for operating the rapid attachment means when said platform is in said first position with said first zone in alignment with said coil winder for detaching said form from said coil winder and for operating said rapid attachment means when said platform is in said first position with said second zone in alignment with said coil winder to connect a replacement form on said second zone of said platform to said coil winder.

2. A device as claimed in claim 1, wherein each said form defines a cylindrical cavity and a transverse cylindrical hole, said rapid attachment means include a main support shank for a said form, which shank is mounted on said coil winder and inserted in a said cylindrical cavity and defines a circumferential groove, and said rapid-attachment means further include a transverse pin for engaging said circumferential groove and being slidable in said transverse cylindrical hole in said form between an operative position in which it couples said main shank to said form and an inoperative position in which a reduced-section portion of said pin corresponds with said main shank so as to allow said form to be removed from said shank.

3. A device as claimed in claim 2, wherein snap-reference means are provided for each of said two positions of said transverse pin.

4. A device as claimed in claim 2, including drive means for said transverse pin comprising a pair of jacks provided with actuator pins and two end spigots of said transverse pin which project from said form and are selectively engageable by said actuator pins.

5. A device as claimed in claim 1, wherein said rapid attachment means include a drive shaft, an expulsion member carried by said coil winder and means for connecting said expulsion member to said drive shaft, and wherein said drive shaft is slidable in said main shank and has a free end surface which defines a slot with a wider bottom portion, and said rapid attachment means include a transverse pin slidable in a body fixed to said expulsion member between a first operative position in which it engages said bottom portion of said slot to couple said expulsion member to said drive shaft and a second position in which a reduced-section portion of said transverse pin is in correspondence with said slot to allow said expulsion member to be removed from said drive shaft.

6. A device as claimed in claim 5, including means for driving said transverse coupling pin comprising a pair of jacks provided with actuator pins and two end spigots of said transverse pin which project from said form and are selectively engageable by said actuator pins.

* * * * *